United States Patent [19]

Fetters et al.

[11] 3,985,830

[45] Oct. 12, 1976

[54] STAR POLYMERS AND PROCESS FOR THE PREPARATION THEREOF

[76] Inventors: Lewis J. Fetters; Le-Khac Bi, both of Akron, Ohio

[73] Assignee: The University of Akron, Akron, Ohio

[22] Filed: July 15, 1974

[21] Appl. No.: 488,676

[52] U.S. Cl. .............................. 260/880 B; 526/21
[51] Int. Cl.² ........................................ C08F 236/10
[58] Field of Search ............... 260/880 B, 879, 83.7

[56] References Cited
UNITED STATES PATENTS

| | | | |
|---|---|---|---|
| 3,280,084 | 10/1966 | Zelinski | 260/880 B |
| 3,281,383 | 10/1966 | Zelinski | 260/880 B |
| 3,637,554 | 1/1972 | Childers | 260/880 B |
| 3,639,517 | 2/1972 | Kitchen | 260/880 B |
| 3,639,521 | 2/1972 | Hsieh | 260/880 B |
| 3,644,322 | 2/1972 | Farrar | 260/880 B |
| 3,651,025 | 3/1972 | Bean | 260/880 B |
| 3,692,874 | 9/1972 | Farrar | 260/880 B |
| 3,778,490 | 12/1973 | Hsieh | 260/880 B |
| 3,803,266 | 4/1974 | Kahle | 260/880 B |
| 3,840,616 | 10/1974 | Clark | 260/880 B |

*Primary Examiner*—Paul R. Michl

[57] ABSTRACT

Disclosed is a series of star polymer products having at least three polymeric arms which radiate from a nucleus having at least two molecules of a linking compound. The polymeric arms may be copolymers of conjugated dienes and monovinyl aromatic compounds and/or homopolymers of either monomer. A novel process for the preparation of the polymer products includes the steps of forming the polymer arms with an organometallic initiator to form polymers terminated by an active chain end and thereafter forming a nucleus with the simultaneous linking of the active chain ends thereto. The nucleus is formed from at least two molecules of a linking compound each having at least two functional groups.

21 Claims, 5 Drawing Figures

STAR POLYMERS AND PROCESS FOR THE PREPARATION THEREOF

The Government has rights in this invention pursuant to Contract No. NSF GH32583X2, awarded by the National Science Foundation.

BACKGROUND OF THE INVENTION

The present invention relates to star or radial polymers having a plurality of long polymeric arms radiating from a nucleus. The invention also relates to a novel process for the preparation of the star polymers described herein.

Star or radial copolymers are generally known and have been utilized as adhesives and in the thermoplastics industry. Such polymers have been prepared by polymerization of a monomer A, with an organolithium compound followed by the addition of another monomer B, to form an AB block copolymer terminated by a lithium ion. Subsequently, a polyfunctional linking agent is added to the lithium terminated AB blocks to form the star or radial structure which consists of the copolymeric arms connected to the linking agent, the linking agent being in such a small proportion to the total weight percent of the resulting copolymer that its presence is relatively inconsequential as compared to the properties of the polymeric constituents.

Many linking agents are available and generally it has been taught that the number of arms formed is dependent upon the number of functional groups carried by the linking agent. Thus, utilizing a di-halo hydrocarbon such as 1,2-dibromoethane, as taught by U.S. Pat. No. 3,507,934, one could prepare an ABA triblock copolymer from the coupling of two AB diblocks. Di and trivinyl aromatic compounds have been used to prepare a difunctional initiator and from that block copolymers of the ABA type have been made as taught by U.S. Pat. No. 3,644,322. Tetrafunctional tin compounds such as tetrallyltin and stannic fluoride may also be selected as disclosed in U.S. Pat. No. 3,639,517 to combine four polymeric arms into one molecule. However, to obtain more than four arms, it has been thought necessary to employ a linking agent having five or more reactive sites. While such compounds may be available, little if any work has been undertaken to obtain, much less study, star polymers having more than four polymeric arms.

Although it has been stated in U.S. Pat. No. 3,639,517, that some monomeric materials may be employed as the linking agent, it was there noted that one could obtain a branched block copolymer but not a radial polymer by such means. Regardless of the linking agent selected or the process by which star polymers have been made, it has not been readily possible heretofore to obtain a polymer having more than four arms and a high molecular weight, e.g., 300,000 and higher, with a relatively low viscosity. As is readily recognized in the art, such molecular weight ranges in linear copolymers, random branched or unbranched, have almost prohibitive viscosities making them unsuitable for most purposes.

SUMMARY OF THE INVENTION

It is, therefore, an object of the present invention to provide a novel star polymer having at least three polymeric arms wherein the arms comprise copolymers of butadiene and styrene and/or of isoprene and styrene and/or homopolymers of butadiene, isoprene or styrene.

It is another object of the present invention to provide a novel star polymer having a lower viscosity than linear homopolymers and triblock copolymers with similar percentage compositions.

It is yet another object of the present invention to provide a novel star polymer possessing excellent thermoplastic properties and which has a higher tensile strength and lower permanent set than linear ABA triblock copolymers.

It is yet another object of the present invention to provide novel star polymers having an ability to tolerate the presence of diblock copolymer units without the concurrent deterioration in tensile properties, behavior characteristically observed for linear block copolymers.

It is a further object of the present invention to provide novel star polymers having a polybutadiene or polyisoprene center and polystyrene end blocks and wherein one or more of the stars may be joined to an adjacent star to form an even larger polymeric substance.

It is a still further object of the present invention to provide a process for the preparation of a star polymer having at least three polymeric arms comprising copolymers of butadiene and styrene and/or of isoprene and styrene, and/or homopolymers of butadiene, isoprene or styrene.

It is yet another object of the present invention to provide a process for the preparation of a star polymer having at least three polymeric arms comprising homopolymers of butadiene, isoprene or styrene of either high or low molecular weight.

It is a still further object of the present invention to provide a process for the preparation of a star polymer as above utilizing a difunctional compound such as divinylbenzene or an aliphatic or aromatic diisocyanate.

These and other objects of the present invention and process will become apparent from the following specification and claims.

In general, the star polymer product according to the present invention has at least three polymeric arms which radiate from a nucleus having at least two molecules of a linking compound. The polymeric arms may be copolymers of conjugated dienes and monovinyl aromatic compounds and/or homopolymers of either monomer.

A process for the preparation of such star polymers includes the steps of forming the polymeric arms by the polymerization of monomers selected from the class consisting of conjugated dienes and monovinyl aromatic compounds in a polymerization solvent and in the presence of an organometallic initiator to form polymers having an active chain end. A nucleus is thereafter formed with the simultaneous linking of the active chain ends thereto by adding an organic linking compound to the polymeric arms. The linking compound selected possesses at least two functional groups resulting in the uniting of at least two molecules of the linking compound to produce the coupling nucleus.

Other star polymers may be prepared wherein one or more of the polymeric arms are homopolymers of conjugated dienes or of monovinyl aromatic compounds. It is also possible to prepare even larger molecular weight polymers by uniting two or more adjacent star polymers of the present invention. In the latter instance, a conventional coupling agent may be employed to join the nucleus of one star polymer to that of an adjacent star.

The star polymers of the present invention may be substituted for nearly any application of the linear polymers having the same composition. A substantial advantage of the star polymers over the corresponding linear polymers is that the molecular weights of the stars may be greatly increased without the attendant increase in viscosity which has characteristically limited the useful molecular weight of the linears to about 125,000. In addition, the star polymers of the present invention exhibit less permanent set, possess a higher tensile strength and can tolerate a higher percentage of free, i.e., unlinked, diblock copolymers without a rapid decrease in tensile strength, than the corresponding linear polymers. Such star polymers may be utilized as adhesives and are quite readily moldable as a thermoplastic to produce an elastomeric product.

DETAILED DESCRIPTION OF THE PREFERRED EMBODIMENTS

In the first step of the preparation of the star polymers of the present invention, the polymeric arms are formed by reacting an organolithium initiator, represented by the formula RLi, with a charge of either a polymerizable monovinyl aromatic compound A, or of a conjugated diene B. As one polymer is formed, e.g., an A block terminated with a lithium ion, the other monomer may be added so as to form the B block of an AB block copolymer also terminated with a lithium ion. Thereafter the AB blocks, or polymeric arms, may be linked together as described hereinbelow or a third charge of monomer A may be made so as to produce an ABA triblock copolymer as the polymeric arm.

The polymerization reactions to produce the polymeric arms are conventional and it is to be understood that the particular conditions under which they are prepared may be altered according to the preferences of the technician. Suitable reaction conditions for the first step require that the polymerizations be conducted in a solvent free from protons such as cyclohexane, benzene or toluene alone or with a polar solvent including cyclic or linear ethers, tertiary amines or phosphines. The reaction temperatures can range from about 20° to 50°C., with 25°C. being preferred, for a period of time ranging from about 1 to 12 hours.

The organolithium initiators, RLi, are those which are hydrocarbon soluble wherein the R represents an aliphatic, cycloaliphatic or aromatic radical. Such compounds are well known initiators and selection of a suitable one, e.g., secbutyllithium, may be made merely on the basis of availability. The amount of initiator employed will depend upon the desired molecular weight of the polymer units. In terms of number average molecular weight, a minimum weight for the A block is between about 5,000 and 10,000 with the maximum extending up to 100,000 or higher. A minimum weight for the B block is between 5,000 and 10,000 with a maximum of 200,000 or higher depending upon viscosity limitations.

The A monomers, or monovinyl aromatic compounds, which may be used are styrene and alkylated styrenes having from 8 to 20 carbon atoms per molecule with styrene and alphamethylstyrene being preferred. The B monomers, or conjugated dienes, which may be employed have at least 4 carbon atoms per molecule with isoprene and 1,3-butadiene being preferred.

In the second step of the preparation of the star polymers of the present invention, the polymeric arms, i.e., AB, BA, ABA, terminated with a lithium ion, are joined by a nucleus comprising at least two molecules of a linking compound each having at least two reactive cites capable of receiving the lithium ion. The preferred linking compounds which may be employed are either divinyl or trivinyl aromatic compounds or aliphatic or aromatic diisocyanates and polyisocyanates. The former group includes such compounds as: 1,2-divinylbenzene; 1,3-divinylbenzene; 1,4-divinylbenzene; 1,2,4-trivinylbenzene; 1,3-divinylnaphthalene; 1,8-divinylnaphthalene; 1,2-diisopropenylbenzene; 1,3-diisopropenylbenzene; 1,4-diisopropenylbenzene; 1,3,5-trivinylnaphthalene; 2,4-divinylbiphenyl; 3,5,4'-trivinylbiphenyl; 1,2-divinyl-3,4-dimethylbenzene; 1,5,6-trivinyl-3,7-diethylnaphthalene; 1,3-divinyl-4,5,8-tributylnaphthalene; and, 2,2'-divinyl-4-ethyl-4'-propylbiphenyl, with divinylbenzene, in either its ortho, meta or para isomer being preferred. The latter group (diisocyanates) includes compounds wherein the carbon atom which bonds the isocyanate group is free from substituents other than hydrogen and compounds which do not cyclopolymerize. Thus, compounds such as toluene diisocyanate and tetramethylene diisocyanate would not work well, if at all, in the second step of the reaction. Compounds which may be successfully employed are: dianisidine diisocyanate; 1,6-diisocyanato-hexane; 1,5-pentamethylene diisocyanate; 3,3'bis tolylene-4,4'diisocyanate and diphenyl-methane diisocyanate.

Other difunctional linking compounds may be employed to form the nucleus such as various diepoxides, diketones and dialdehydes, either aliphatic or aromatic having up to approximately 12 carbon atoms. Representative examples of each include cyclohexane diepoxide, 1,4-pentane diepoxide, 1,5-hexane diepoxide, 2,4-hexane-di-one, 2,5-hexane-di-one, 2,6-heptane-di-one, 1,4-butanedial, 1,5-pentanedial and 1,6-hexanedial.

The linking of the polymeric arms to the molecules of linking compound may be conducted with continuous stirring at approximately 25°C. and is generally completed within about 8 hours or less.

During the linking reaction a lithium active chain end of a polymeric arm combines with one vinyl carbon of the divinylbenzene while the lithium ion is added to the remaining vinyl carbon. The resultant product may combine with another molecule of the linking compound by attack of the lithium ion on the vinyl group of the second molecule. Simultaneously, the lithium active chain ends of other available polymeric arms attack the available vinyl groups of the linking compound as they combine to form a nucleus.

The resultant polymer product has a relatively small molecular weight nucleus having at least two molecules of the linking compound joining three or more of the polymeric arms which surround the nucleus in what is deemed to be a star configuration rather than a branched linear structure. Inasmuch as the linking reaction involves an addition to the vinyl groups rather than a substitution or replacement reaction, the nucleus becomes lithiated as it is formed and can therefore initiate further polymerizations. The linking reaction which is relatively clean, i.e., having a low percentage of unreacted diblock copolymer, may be finally terminated by the addition of any suitable compound having available protons to remove the lithium from the nucleus.

The linking reaction proceeds similarly when the diisocyanate linking compound is employed in which case the carbon nitrogen double bond is the site of primary attack by the lithium ion. Similarly, the diepoxides, diketones and dialdehydes provide carbonyl groups as the site for the anionic attack by the lithium ion of an active chain end polymeric arm. As in the case of the preceding linking compounds, both the polymeric arm and the lithium ion are joined to the linking compound which then combines with other linked molecules such as it has become, or with other free molecules of the linking compound or with other available polymeric chains. The nucleus thus formed is lithiated and can therefore initiate polymerization of other monomers if desirable.

It is important to note that during the linking reaction, molecules of the linking compound are joining together forming a nucleus while the polymeric arms are linked thereto forming the star product. Unlike other processes wherein the number of polymeric arms which can be combined is directly related to the number of functional groups carried by the linking compound, with the preferred method described herein, it is now possible to obtain polymers having as many as 20, 30 or even more, polymeric arms utilizing only di and tri functional linking compounds. Although it would appear to be within reason to suggest that an upper limit to the number of arms per molecule does exist, there is at the present time no suggestion that 30 arms would represent the upper limit. Indeed, depending upon the desired properties, star polymers having many more arms should be obtainable according to the preferred method set forth herein. In order to link at least three and preferably more of the polymeric arms to the nucleus of di or tri functional compounds, the ratio of linking compound to lithium active chain ends must range from at least 2.4:1 and upwards, e.g., 20:1. When the concentration of linking compound is less than that of the preceding range, linear polymers are obtained resulting from the coupling of two polymeric arms to the reactive groups of separate molecules of the linking compound.

As stated hereinabove, star polymers of the present invention include those having diblock and/or triblock copolymeric arms wherein the nucleus becomes polylithiated subsequent to the linking of the arms to the linking compound. It is also possible to generate additional arms of homopolymers of a diene or of styrene, or other suitable monomers, by adding the monomer to the star polymer the nucleus of which serves as an efficient initiator. It is further possible to join two or more of the star polymers together by employing a conventional linking agent, e.g., phosgene, silicon tetrachloride or a dihalo silane such as dichlorodimethylsilane.

The morphology of solvent-cast, well-annealed films of the star block copolymers was examined via electron microscopy. Without exception, a body-centered cubic array of spherical polystyrene domains was observed for all of the star block copolymers examined. As a result of these observations it has been concluded that there apparently exists in these star block copolymers long-range order with regard to the polystyrene domains; a degree of order which is not present in the linear block copolymers. It has been found, as depicted in the drawings, that the star block copolymers exhibit markedly superior tensile properties as compared to the linear materials. Furthermore, the networks of the star block copolymers are less prone to disintegrate at temperatures approaching the glass transition temperature of polystyrene than are its linear counterparts.

Table I presents in part various star polymers prepared according to the preferred method herein. The columns, from left to right, list the components and run number of a polymer, the average number of arms of the product, the average molecular weight of each diblock arm and the average molecular weight of the polymer. Several linear triblock copolymers and other star polymers, prepared via known methods, are also listed for comparison with the star polymers in the drawings. In the table, each of the polymeric arms is polystyrene-polyisoprene. When the polyisoprene units are coupled directly together, the linear triblock copolymer polystyrene-polyisoprene-polystyrene (SIS) is formed. When the linking compound divinylbenzene (DVB) is employed, the polyisoprene units bond to the nucleus surrounding it and are in turn encompassed by the attached polystyrene units. The diisocyanate linking compound has been abbreviated as di NCO, and the conventional linking compound, silicon tetrachloride, has been indicated by its chemical formula.

TABLE I

| Star Run No. | Arms | Mol. Wt. of Arm | Mol. Wt. of Polymer |
|---|---|---|---|
| SIS-DVB-1-1 | 6 | 66,000 | 400,000 |
| SIS-DVB-3 | 7 | 66,000 | 448,000 |
| SIS-DVB-4 | 10 | 64,000 | 626,000 |
| SIS-DVB-5 | 7 | 71,600 | — |
| SIS-DVB-5-1 | 7 | 71,600 | 326,000 |
| SIS-DVB-6 | 6 | 51,000 | 305,000 |
| SIS-DVB-8 | 6 | 78,300 | 485,000 |
| SIS-DVB-20 | 16 | 58,000 | 800,000 |

TABLE I-continued

| | | | |
|---|---|---|---|
| SIS-di NCO-21 | 12 | 68,000 | 850,000 |
| SIS-di NCO-22 | 15 | 92,000 | 1,400,000 |
| Linear Run No. | | | |
| SIS-1 | 2 | 60,000 | 120,000 |
| SIS-13 | 2 | 45,000 | 90,000 |
| SIS-17 | 2 | 45,000 | 90,000 |
| SIS-18 | 2 | 70,000 | 140,000 |
| Conventional Star Run No. | | | |
| SIS-SiCl$_4$-12 | 3 | 73,000 | — |
| SIS-SiCl$_4$-12-1 | 3 | 73,000 | 210,000 |
| SIS-SiCl$_4$-15 | 3 | 77,000 | 216,000 |

Figure 1:
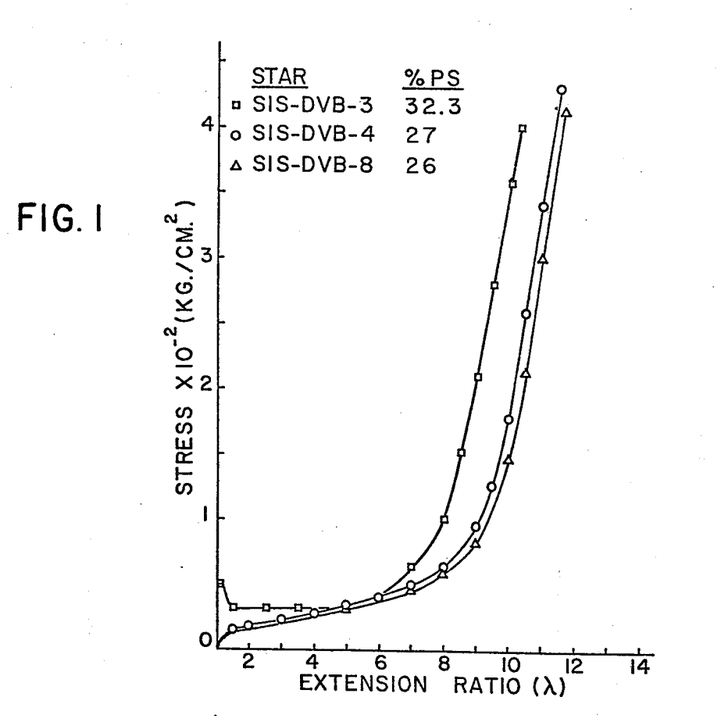
FIG. 1 graphically depicts the plot of stress against extension ratio for three of the star polymers of the present invention.
Figure 2:
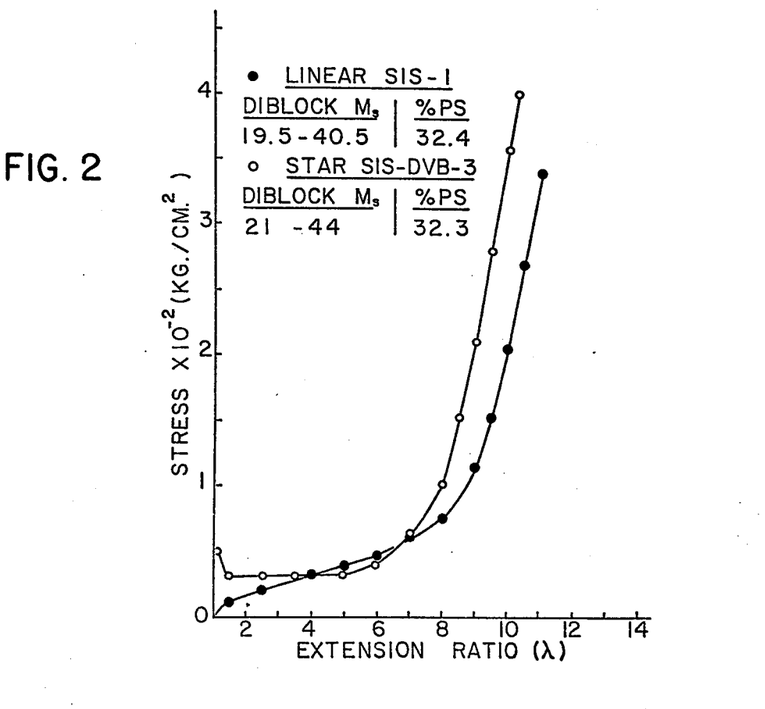
FIG. 2 graphically depicts the plot of stress against extension ratio for one of the star polymers of FIG. 1 compared with a linear triblock copolymer of similar composition.

Referring now to the drawings, in FIG. 1, the extension ratio ($\lambda$) at break has been plotted in multiples of 100 percent against stress in terms of hundred kilograms per square centimeter. The percentage of polystyrene (%PS) for each of the stars is also given. In FIG. 2 the star polymer SIS-DVB-3, from FIG. 1 has been plotted against a linear triblock copolymer, both having a nearly identical percentage composition of polystyrene and a similar diblock molecular weight.

Figure 3:
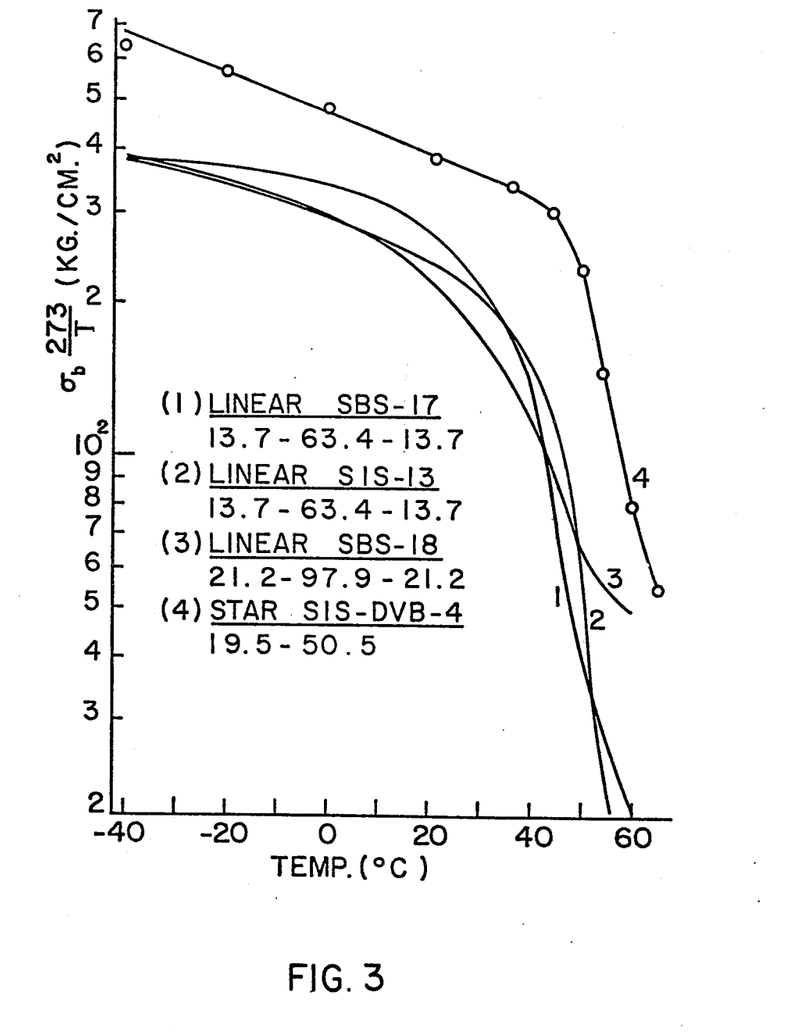
FIG. 3 graphically depicts the plot of tensile strength against temperature for three linear triblock copolymers compared with one of the star polymers of FIG. 1.

In FIG. 3 the effect of increasing temperature has been plotted against tensile strength at break ($\sigma_b$) for three of the linear triblock copolymers and one of the star polymers, relative molecular weights again being compared. A pronounced improvement in resistance to break is evidenced by plot 4 of the star polymer from low temperatures through temperatures greater than 60°C.

Figure 4:
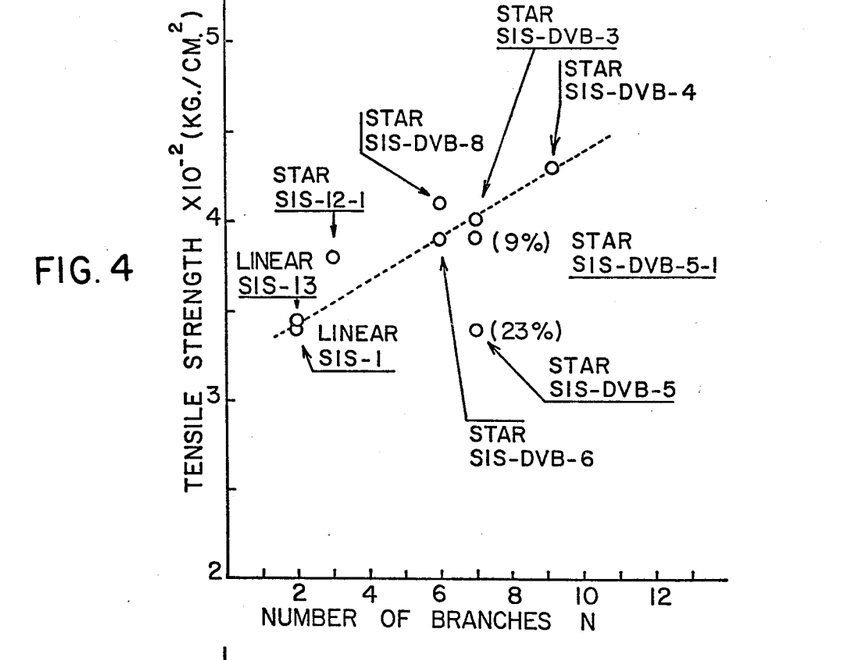
FIG. 4 graphically depicts the plot of tensile strength against the number of polymeric arms for two linear triblock copolymers compared with several of the star polymers of the present invention and a known star polymer; and, FIG. 5 graphically depicts the plot of true tensile strength at break against the number of polymeric arms for two linear triblock copolymers compared with several of the star polymers of the present invention and several known star polymers.

In FIG. 4 the observed tensile strength in terms of hundred kilograms per square centimeter has been plotted against the number of arms or branches N per molecule of polymer. The two linear compounds SIS-1 SIS-13 both have the lowest tensile strength, having but two polymeric arms, while the star polymers demonstrate an improvement in tensile strength as the number of arms increases. Although the increase is nearly linear, as depicted by the dotted line drawn through several of the points, it appears that the star polymer SIS-DVB-5, having seven arms per molecule, was no stronger than the two linear polymers tested. Actually, this star when prepared, contained approximately 23 percent of unlinked diblock, i.e., polystyrene-polyisoprene, and, after removal of 14 percent of the unlinked diblock the same polymer, labeled (9 percent) STAR SIS-DVB-5-1, was able to show a markedly improved tensile strength. As will be seen in Table II hereinbelow, the star polymers have a greater ability to tolerate unlinked diblock copolymers than do the linear triblock copolymers.

Figure 5:
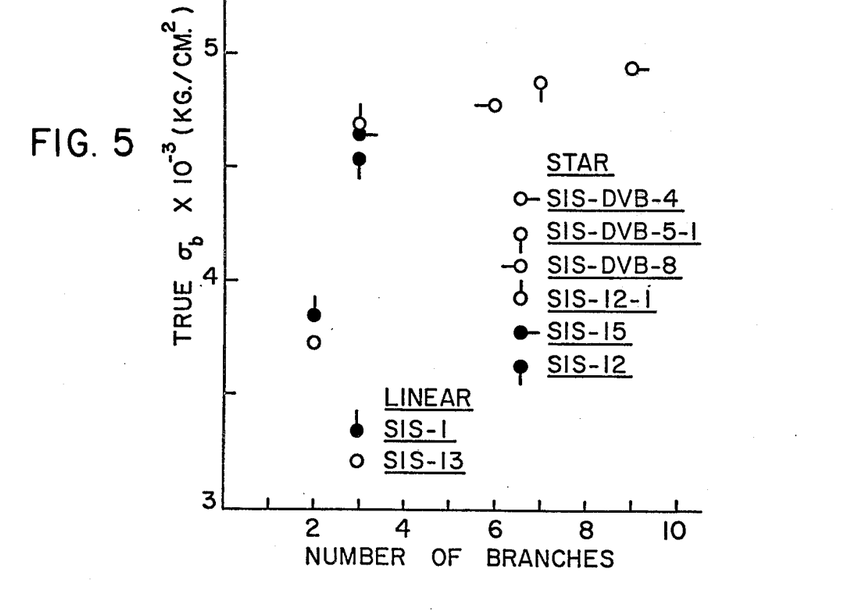

In FIG. 5 a plot similar to FIG. 4 is presented except that here the true tensile strength at break ($\sigma_b$) is given. The true tensile strength is a measurement which compensates for the fact that the cross-sectional area of the particular sample decreases as the elongation is increased. Here an even greater tensile strength is demonstrated and if a line were to be drawn from the linear polymers through the star polymer SIS-DVB-4, not only would it have a greater slope than the dotted line in FIG. 4, but also, the other star polymers would lie above the line.

An additional advantage of the star block copolymers is their ability to tolerate the presence of diblock copolymer without a serious concurrent deterioration in tensile properties, behavior which is in sharp contrast to that observed for the linear block copolymers. This is demonstrated by the stress-strain behavior of the two block copolymers as outlined in Table II below. The number-average molecular weight of the styrene-isoprene copolymer was 60,000 (19,500 and 40,500, respectively) and of the triblock copolymer was 130,000 (21,000, 88,000 and 21,000). Molecular weight of the star polymer was 448,000 with an average of 7 arms.

TABLE II

Effect of Added Diblock Copolymer on Tensile Strengths of Linear and Star SIS Block Copolymers

| Weight % Diblock Copolymer | Linear SIS Copolymer $\sigma_b$ kg/cm$^2$ | Star SIS-DVB-3 $\sigma_b$ kg/cm$^2$ |
|---|---|---|
| 0 | 340 | 390 |
| 2 | 330 | — |
| 5 | 300 | 365 |
| 20 | 235 | 300 |
| 30 | 290 | — |
| 40 | 145 | 210 |
| 60 | 67 | 87 |

In Table III specific formulation for several of the polymers presented in Table I are set forth as exemplary of the procedure by which star polymers having polystyrene-polyisoprene arms may be made pursuant to the preferred method described herein. Temperatures were maintained at approximately 25°C. The periods of time for polymerization of the styrene and the isoprene were extended to the maximum (12 hours) to insure the highest degree of polymerization. The actual times for the linking step was as is presented in Table III, although the reactions were substantially completed within 8 hours or less. The reactions were all conducted by charging the solvent and styrene into the reaction chamber followed by addition of the organometallic initiator. After substantially all of the styrene had polymerized, the isoprene was then admitted to be polymerized by the lithium active chain end of the polystyrene. Subsequent to the formation of the polymeric diblock arm, the linking compound was added with constant stirring, whereupon the nucleus was formed with concurrent linking of the polymeric arms thereto. Linking compounds employed were m-divinylbenzene, 1,6-hexamethylene diisocyanate (run no. 21) and diphenylmethane diisocyanate (run no. 22). Following completion of the linking step, the lithium was removed from the nucleus by the addition of methanol to the reaction vessel. It is to be noted, in Table III, that the first run, SIS-DVB-0, was conducted with the ratio of linking compound to the lithium active chain ends being less than 2:1 and, that a linear triblock copolymer was obtained rather than a star polymer.

TABLE III

| Star Run No. SIS- | Styrene | Isoprene | Benzene | Sec-butyl-lithium millimoles | Ratio of Linking Compound: Lithium | Time in Hours for Linking Step | Number of Arms | Unlinked Diblock (wt. %) |
|---|---|---|---|---|---|---|---|---|
| DVB-0 | 8.15 g. | 17.03 g. | 300 mls. | 0.4 | 1.55:1 | 12 | 2 | 32 |
| DVB-1-1 | 8.00 g. | 16.90 g. | 300 mls. | 0.4 | 3.1:1 | 12 | 6 | 3 |
| DVB-3 | 7.93 g. | 16.62 g. | 300 mls. | 0.377 | 3.26:1 | 20 | 7 | 3 |
| DVB-4 | 7.96 g. | 17.57 g. | 300 mls. | 0.402 | 6.12:1 | 24 | 10 | 3 |
| DVB-5 | 8.39 g. | 18.04 g. | 370 mls. | 0.382 | 12.64:1 | 24 | 7 | none |
| DVB-6 | 6.0 g. | 13.28 g. | 350 mls. | 0.383 | 3.23:1 | 30 | 6 | 2 |
| DVB-8 | 3.73 g. | 21.8 g. | 300 mls. | 0.373 | 4.4:1 | 30 | 6 | 2 |
| DVB-20 | 12.0 g. | 36.0 g. | 400 mls. | 1.0 | 20:1 | 24 | 16 | 3 |
| di NCO-21 | 14.7 g. | 35.0 g. | 500 mls. | 0.73 | 20:1 | 24 | 12 | none |
| di NCO-22 | 14.0 g. | 35.0 g. | 500 mls. | 0.53 | 28:1 | 24 | 15 | none |

In another run, SIS-DVBI-8, the star polymer SIS-DVB-8 was prepared as previously described. However, subsequent to the linking step an additional charge of isoprene (10 gms.) was added and allowed to polymerize for 6 hours. The resulting star polymer had a number average molecular weight of 757,000 and average of 10 arms. As the previous star polymer, SIS-DVB-8 had 6 arms, the additional 4 arms were homopolymers of polyisoprene. The new star polymer had a tensile strength at break of 250 kg/cm$^2$ and an extension ratio of 13 compared with the respective values of 410 kg/cm$^2$ and 11.7 for the SIS-DVB-8 star polymer.

In Table IV the intrinsic viscosities for seven of the star polymers of the present invention are given in terms of deciliters/gram (dl/gm). Measurements were made at 25°C. and in the solvent tetrahydrofuran (THF). For purposes of comparison, intrinsic viscosities of conventional star polymers having four polymeric arms of SB (styrene-butadiene) linked by a single molecule of silicon tetrachloride are listed, (Runs SBS-SiCl$_4$-1 through 3) as are the linear triblock copolymers (Runs SIS-13, 17 and 18 and Runs SBS-2 through 16) and the linear diblock copolymers (Runs SB-1 through 4). These measurements were made in toluene at 30°C. The values for the last twelve copolymers, SBS-9 through 16 and SB-1 through 4, were not conducted at this time but were obtained from an earlier investigation which appeared in the *Journal of Polymer Science*, Vol. 6, 2051 (1968) by L. Utracki, R. Simha and L. J. Fetters.

It has generally been experienced that intrinsic viscosities of up to about 1.3 to 1.6 are tolerable for most commonly used linear copolymers. It will be readily noted from Table IV that the star polymers of the present invention having a molcular weight of up to about 800,000 are within this limit while corresponding molecular weights for various linear copolymers far exceed intrinsic viscosities of 1.6. Additionally, it is seen that known star polymers, having four arms, possess acceptable viscosities and that viscosities do not readily increase as more arms are added.

TABLE IV

| Star Run No. SIS- | Weight % Polystyrene | Mol. Weight of Polymer | Intrinsic Viscosity (dl/gm) |
|---|---|---|---|
| DVB-3 | 33 | 448,000 | 1.3 |
| DVB-4 | 31 | 626,000 | 1.4 |
| DVB-5-1 | 26 | 326,000 | 1.2 |
| DVB-6 | 32 | 305,000 | 1.25 |
| DVB-8 | 26 | 485,000 | 1.2 |
| DVB-20 | 25 | 800,000 | 1.6 |
| di NCO-22 | 28 | 1,400,000 | 1.5 |
| Star Run No. SBS- | | | |
| SiCl$_4$ | 40 | 240,000 | 1.3 |
| SiCl$_4$ | 30 | 280,000 | 1.4 |
| SiCl$_4$ | 40 | 150,000 | 0.82 |
| Linear Run No. | | | |
| SIS-13 | 31 | 90,000 | 0.78 |
| SIS-17 | 31 | 90,000 | 0.79 |
| SIS-18 | 31 | 140,000 | 1.05 |
| Linear Triblock Copolymer Run No. | | | |
| SBS-4 | 50 | 40,000 | 0.49 |
| SBS-3 | 50 | 58,000 | 0.64 |
| SBS-2 | 50 | 140,000 | 1.1 |
| SBS-5 | 50 | 300,000 | 1.91 |
| SBS-7 | 50 | 650,000 | 2.78 |
| SBS-6 | 50 | 720,000 | 3.23 |
| SBS-8 | 50 | 1,100,000 | 4.14 |
| SBS-9 | 45 | 34,000 | 0.44 |
| SBS-10 | 45 | 45,000 | 0.55 |
| SBS-11 | 36 | 55,000 | 0.67 |
| SBS-12 | 30 | 69,000 | 0.86 |
| SBS-13 | 20 | 118,000 | 1.45 |
| SBS-14 | 40 | 141,000 | 1.65 |
| SBS-15 | 11 | 173,000 | 1.90 |
| SBS-16 | 4 | 516,000 | 7.50 |
| Linear Diblock Copolymer Run No. | | | |
| SB-1 | 33 | 43,000 | 0.57 |

TABLE IV-continued

| SB-2 | 13  | 104,000 | 1.30 |
| SB-3 | 12  | 130,000 | 1.50 |
| SB-4 | 2.6 | 625,000 | 6.10 |

The foregoing method pertaining to the synthesis of the star block copolymers may also be applied to the synthesis of high or low molecular weight polymers comprising a plurality of polydiene arms and a relatively low viscosity. The use of a linking compound from the class presented herein permits the synthesis of polydienes containing at least 10–12 arms per polymer molecule. Thus, for example, a high molecular weight polydiene e.g., 100,000 or higher, can readily be synthesized from a polydiene having a molecular weight of 5,000–10,000. Such a polymer would have several advantages over conventional linear materials of the same molecular weight including, lower viscosity due to the smaller volume of the star configuration compared to the linear chain, and a permanent cross link site of high functionality at the nucleus of the star polymer. This latter feature would be expected to facilitate any postpolymerization network formation by virtue of the fact that the arms would already be linked one to the other at one of their ends. This would be of particular use for those applications where a low viscosity polydiene is required. Hence, one can have the required low viscosity combined with a molecular weight of 20,000–50,000.

The preparation of two star polybutadienes was as follows:

EXAMPLE I

Into a suitable reaction vessel was charged 24 gms. of 1,3-butadiene and 300 mls. of benzene. Polymerization was initiated with 1.9 millimoles of sec-butyllithium at a temperature of approximately 25°C. for 3 hours. Thereafter, the linking agent m-divinylbenzene (ratio 2.40:1) was added for the linking step. After 6 hours the reaction was terminated by the addition of methanol. Gel permeation chromatograms of the resulting star polymers revealed a number-average molecular weight of 52,000. The molecular weight of the polybutadiene was approximately 12,000 indicating the average number of arms in the star polymer to be 4.

EXAMPLE II

Into a suitable reaction vessel was charged 20 gms. of 1,3-butadiene and 300 mls. of benzene. Polymerization was initiated with 4.0 millimoles of sec-butyllithium at a temperature of approximately 25°C. for 3 hours. Thereafter, the linking agent m-divinylbenzene (ratio 2.52:1) was added for the linking step. After 6 hours the reaction was terminated by the addition of methanol. Gel permeation chromatograms of the resulting star polymers revealed a number-average molecular weight of 30,000. The molecular weight of the polybutadiene was approximately 5,000 indicating the average number of arms in the star polymer to be 6.

Thus it can be seen that the disclosed invention carries out the objects of the invention set forth above. As will be apparent to those skilled in the art, many star polymers having polymeric arms comprising homopolymers, copolymers, block or random, or triblock copolymers and combinations thereof utilizing conjugated diene and monovinyl aromatic monomers, can be prepared without departing from the spirit of the invention herein disclosed and described, the scope of the invention being limited solely by the scope of the attached claims.

We claim:
1. A polymer product comprising:
   a nucleus having more than one molecule of m-divinyl-benzene; and,
   at least three polymeric arms linked to said nucleus, wherein said polymeric arms are selected from the group consisting of homopolymers and copolymers of conjugated diene monomers and block copolymers of conjugated diene and monovinyl aromatic monomers wherein said conjugated diene block is linked to said nucleus.

2. A polymer product, as set forth in claim 1, wherein said conjugated diene is selected from the group consisting of butadiene and isoprene and said monovinyl aromatic compound is selected from the group consisting of styrene and alkylated styrenes having from 8 to about 20 carbon atoms.

3. A polymer product, as set forth in claim 1, wherein said conjugated diene has a molecular weight ranging from 5,000 to about 200,000 and said monovinyl aromatic compound has a molecular weight ranging from 10,000 to about 100,000.

4. A polymer product, as set forth in claim 1, wherein the ratio of said molecules to said polymeric arms is at least 2.4:1.

5. A polymer product, as set forth in claim 2, having from 3 to about 16 polymeric arms per molecule wherein said conjugated diene is isoprene and said monovinyl aromatic compound is styrene.

6. A polymer product, as set forth in claim 2, having from 4 to about 12 polymeric arms per molecule wherein said arms are polybutadiene.

7. A polymer product having at least two star polymers joined together wherein each said star polymer comprises:
   a nucleus having more than one molecule of a linking compound; and,
   at least three polymeric arms linked to said nucleus, wherein said polymeric arms are selected from the group consisting of homopolymers and copolymers of conjugated diene monomers, monovinyl aromatic monomers and combinations thereof; and,
   wherein said star polymers are joined at said nuclei by a linking agent selected from the group consisting of phosgene, silicon tetrachloride and dihalo silanes.

8. A polymer product, as set forth in claim 7, wherein said linking compound is selected from the group consisting of polyvinyl aromatic compounds, aliphatic and aromatic diisocyanates and polyisocyanates, and aliphatic and aromatic diepoxides, diketones and dialdehydes having up to about 12 carbon atoms.

9. A polymer product, as set forth in claim 7, wherein said conjugated diene is selected from the group consisting of butadiene and isoprene and said monovinyl aromatic compound is selected from the group consisting of styrene and alkylated styrenes having from 8 to about 20 carbon atoms.

10. A polymer product, as set forth in claim 7, wherein said conjugated diene has a molecular weight ranging from 5,000 to about 200,000 and said monovinyl aromatic compound has a molecular weight ranging from 10,000 to about 100,000.

11. A process for the preparation of a polymer product having at least two star polymers joined together wherein each said star comprises a nucleus and at least three polymeric arms extending from said nucleus, comprising the steps of:
preparing said polymeric arms from monomers selected from the group consisting of conjugated dienes and monovinyl aromatic compounds with an organometallic initiator so as to form polymers terminated by an active chain end;
forming said nucleus while simultaneously linking said active chain ends thereto by
adding to said polymeric arms an organic linking compound having at least two functional groups wherein the ratio of said linking compound to said active chain ends is at least 2.4:1; and,
joining at least two of said star polymers at said nuclei by a linking agent selected from the group consisting of phosgene, silicon tetrachloride and dihalo silanes.

12. A process for the preparation of a polymer product, as set forth in claim 11, wherein said conjugated diene is selected from the group consisting of butadiene and isoprene and said monovinyl aromatic compound is selected from the group consisting of styrene and alkylated styrenes having from 8 to about 20 carbon atoms.

13. A process for the preparation of a polymer product, as set forth in claim 11, wherein said conjugated diene has a molecular weight ranging from 5,000 to about 200,000 and said monovinyl aromatic compound has a molecular weight ranging from 10,000 to about 100,000.

14. A process for the preparation of a polymer product, as set forth in claim 11, wherein said polymeric arms comprise:
block copolymers of styrene and isoprene wherein said isoprene is linked to said nucleus.

15. A process for the preparation of a polymer product, as set forth in claim 11, wherein said linking compound is selected from the group consisting of polyvinyl aromatic compounds, aliphatic and aromatic diisocyanates and polyisocyanates, and aliphatic and aromatic diepoxides, diketones and dialdehydes having up to about 12 carbon atoms.

16. A process for the preparation of a polymer product, as set forth in claim 11, wherein
formation of said polymeric arms is conducted in a suitable solvent at a temperature of from 20° to about 50°C. for a period of time of 1 to about 12 hours and,
formation of said nucleus is conducted at a temperature of from 20°C. to about 50°C. for a period of time of 1 to about 8 hours with constant mixing of said linking compound and said polymeric arms.

17. A process for the preparation of a polymer product, as set forth in claim 11, including the further step of:
adding an additional amount of said monomer subsequent to formation of said nucleus whereby said nucleus serves as an initiator for said monomer to form additional polymeric arms in the polymer product.

18. A polymer product, as set forth in claim 1, having from 5 to about 16 polymeric arms per molecule.

19. A polymer product, as set forth in claim 18, wherein said conjugated diene is selected from the group consisting of butadiene and isoprene and said monovinyl aromatic compound is selected from the group consisting of styrene and alkylated styrenes having from 8 to about 20 carbon atoms.

20. A polymer product, as set forth in claim 18, wherein said conjugated diene has a molecular weight ranging from 5,000 to about 200,000 and said monovinyl aromatic compound has a molecular weight ranging from 5000 to about 100,000.

21. A polymer product, as set forth in claim 18, wherein the ratio of said molecules to said polymeric arms is at least 3:1.

* * * * *

US003985830B1

REEXAMINATION CERTIFICATE (3446th)

United States Patent [19]

Fetters et al.

[11] B1 3,985,830

[45] Certificate Issued Mar. 3, 1998

[54] STAR POLYMERS AND PROCESS FOR THE PREPARATION THEREOF

[75] Inventors: Lewis J. Fetters; Le-Khac Bi, both of Akron, Ohio

[73] Assignee: The University of Akron, Akron, Ohio

Reexamination Request:
No. 90/003,437, May 17, 1994

Reexamination Certificate for:
Patent No.: 3,985,830
Issued: Oct. 12, 1976
Appl. No.: 488,676
Filed: Jul. 15, 1974

[51] Int. Cl.$^6$ .................... C08F 297/04; C08F 287/00
[52] U.S. Cl. .................... 525/192; 525/193; 525/314; 525/271; 525/122; 525/123; 525/153; 525/154; 525/289; 525/316; 525/332.9; 525/342; 525/383
[58] Field of Search ............................... 525/192, 193, 525/314

[56] References Cited

U.S. PATENT DOCUMENTS

| | | | |
|---|---|---|---|
| 3,280,084 | 10/1966 | Zelinski et al. | 260/83.7 |
| 3,639,517 | 2/1972 | Kitchen et al. | 260/879 |
| 3,644,322 | 2/1972 | Farrar | 260/94.2 |
| 3,646,161 | 2/1972 | Marwede et al. | 260/876 |
| 3,652,732 | 3/1972 | Makowski et al. | 260/880 |
| 3,725,370 | 4/1973 | Kitchen et al. | 260/85.1 |
| 3,855,189 | 12/1974 | Farrar | 260/85.1 |

FOREIGN PATENT DOCUMENTS 716645 8/1965 Canada.

OTHER PUBLICATIONS

"Hawley's Condensed Chemical Dictionary," twelfth edition, Van Nostrand Reinhold Co., New York, 1993, p. 438.
I.U.P.A.C. Preprint, "Synthesis of Star-Shaped Macromolecules by Anionic Copolymerization." Zilliox, Parrod, and Rempp, (1967).

Macromolecule Reviews, "Homogeneous Anionic Polymerization of Unsaturated Monomers," Fetters et al., vol. 1, 2, pp. 71–113, (1967).

J. Poly. Science: Part C, "Préparation de Macromolécules à Structure en Etoile, par Copolymerization Anionique," Zilliox, Parrod, and Rempp, No. 22, pp. 145–156 (1968) and translation.

Can. J. Chem., "Preparation et characterisation de polymeres–modele a structure en etoile, par copolymerisation sequencee anionique," Rempp et al. vol. 47, No. 8, pp. 3379–3385, (1969) and translation.

Kantschuk und Gummi.Kunststoffe 22 Jahigang Nr. pp. 691–706, Dec. 1969 "Anioniosche Butadien/Styrol–Copolymer" Marwede et al., (1969) and translation.

J of Applied Polymer Science, "The Preparation of Some Block Copolymers," Worsfold et al., vol. 14, pp. 1671–1677 (1970).

Rempp,titled "Syntheses et Structures Nouvelles de Polymeres",Macromol.Chem.—4, Louvain, 12–16 Jun. 1967, pp. 403–415.

Ph.D.thesis by Zolliox,titled "Préparation et étude physiochimique de macromolécules–modéle à structure en étoile" submitted Apr. 30, 1970.

Primary Examiner—Vasu Jagannathan

[57] ABSTRACT

Disclosed is a series of star polymer products having at least three polymeric arms which radiate from a nucleus having at least two molecules of a linking compound. The polymeric arms may be copolymers of conjugated dienes and monovinyl aromatic compounds and/or homopolymers of either monomer. A novel process for the preparation of the polymer products includes the steps of forming the polymer arms with an organometallic initiator to form polymers terminated by an active chain end and thereafter forming a nucleus with the simultaneous linking of the active chain ends thereto. The nucleus is formed from at least two molecules of a linking compound each having at least two functional groups.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7–17 is confirmed.

Claims 1–6 and 18–21 are cancelled.

* * * * *